UNITED STATES PATENT OFFICE.

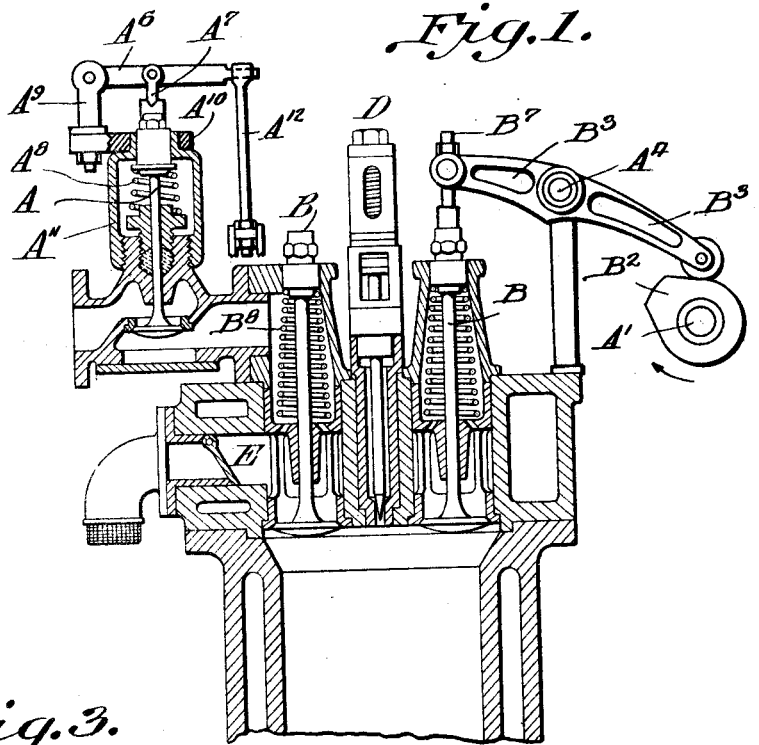
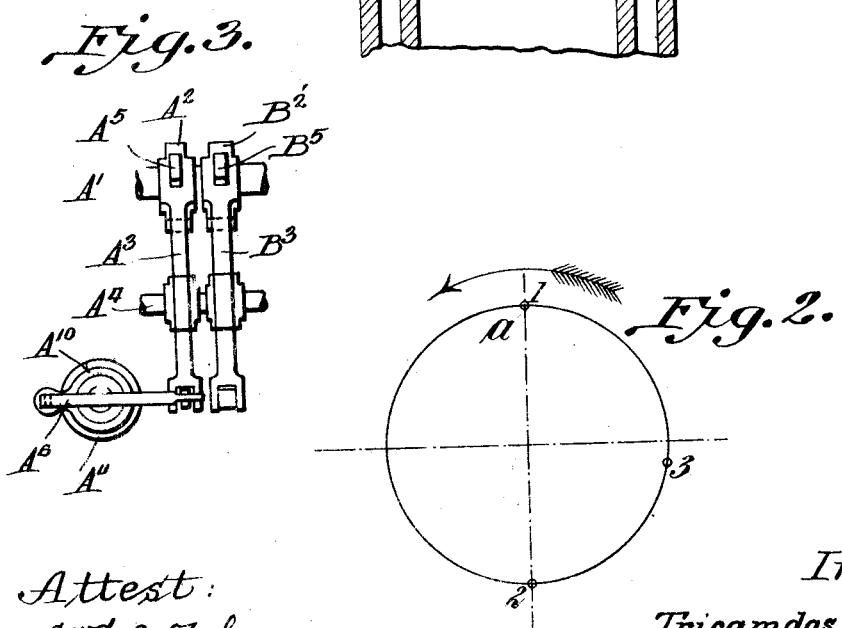

TRICAMDAS KALIANJEE AND ANANT BABURAO PARANJAPE, OF BOMBAY, INDIA.

INTERNAL-COMBUSTION ENGINE.

1,142,581. Specification of Letters Patent. Patented June 8, 1915.

Application filed November 1, 1913. Serial No. 798,726.

*To all whom it may concern:*

Be it known that we, TRICAMDAS KALIANJEE and ANANT BABURAO PARANJAPE, Hindu subjects of the Emperor of India, residing at Bombay, India, have invented certain new and useful Improvements in Internal-Combustion Engines, of which the following is a specification.

This invention is for improvements in internal combustion engines.

The object of this invention is to increase the power developed by internal combustion engines of any given size by an increase of the air and oil supplies. The power of all existing internal combustion engines is limited by the amount of oxygen their cylinders can take in at one stroke when open to the atmosphere. When the air is cold and the cylinder is cool the maximum charge may be drawn in and the maximum amount of oil may be consumed completely. In a hot engine room where the temperature may be 100° Fah. and upward and the cylinder is already highly heated by working, the air is heated and expanded while entering, and thus the amount of oxygen or weight of air drawn in is reduced considerably, and the power of the engine is reduced in proportion. This condition must continue so long as the cylinder draws its supply direct from the air at its ordinary pressure.

In the present invention means are used to increase the quantity of oxygen contained in the air-charge of the cylinder, and by way of illustration its application to a Diesel engine will now be shown.

Instead of limiting the amount of oxygen to what is ordinarily drawn into the cylinder by the movement of the piston, an additional supply of compressed air is provided by means of which a supplementary quantity is added to that already drawn in and thus with an increase in the oxygen supply a greater supply of oil may be burnt producing an increased volume of highly heated and elastic gases. As the fuel charge of the Diesel engine is not burnt instantaneously but is fed in during a certain period of time, there need be no increase beyond the ordinary pressure of 28 to 35 atmospheres and no increase in the temperature of combustion. For this an adequate increase of clearance is provided in the cylinder head.

The invention is shown in the attached drawing in Figures 1 and 2.

Fig. 1 is a vertical sectional view of an engine with parts shown in elevation. Fig. 2 is a diagram illustrating the cycle of operation and, Fig. 3 is a fragmental plan view of the cam mechanism.

Fig. 1 represents the cover of a Diesel engine to which are attached additional valves A and E. The air suction valve B, the exhaust valve C and the fuel valve D are those in general use.

The cycle of operation of this engine is as follows, starting from the air suction stroke as indicated on the diagram of revolution in Fig. 2. During the suction stroke air is admitted to the cylinder through the air valves E and B at position 1 of the crank-pin A and continues until the crank-pin reaches position 2. At this point the non-return valve E (Fig. 1) closes automatically but the valve B is kept open by a cam until the piston has made about half of its return stroke, namely to the point 3, so that compressed air from the valve A enters the cylinder while the crank-pin passes from point 2 to point 3 of its course. The valves A and B now close simultaneously at point 3 and compression commences and continues until the oil supply ignites and is consumed in the usual way. Valve A like valve B is operated by a cam suitably adjusted.

Some of the surplus heat of combustion may be used for heating the compressed air between the compression pump and the valve A by means of any suitable heater without increasing its volume which would diminish its oxygen per cubic foot.

A further improvement consists in reopening the valve A just enough to admit air to the cylinder through the valve B which is also made to open at the moment when the piston is about to complete its exhaust stroke and while the exhaust valve is still open. This secondary supply of compressed air is let in, in order to scavenge the exhaust gases in the clearance space of the cylinder, so that the fresh charge of air is free from impurities.

In the particular case of a Diesel engine to which we have shown our apparatus attached the means of operating the valves A and B are as follows:—The arrows show the directions of movement of the cam shaft A¹ driven by gearing off the crank shaft of the engine at half the speed of the latter. The crank shaft and the gearing are not shown. Upon this cam shaft are mounted two cams A², and B². The cam A² works the valve A, and the cam B² works the valve B. A³, and B³ are two levers swinging on the same fulcrum shaft A⁴. A⁵, B⁵, are hardened steel rollers mounted in the jaws at the cam end of the two levers respectively and these rollers rotate on the contours of their respective cams. The projection of the cam A², lifts up the cam end of the lever A³ at the desired period of the stroke of the piston and consequently the valve end of this lever is pressed down. This end of this lever is connected to the end of a lever A⁶ by means of a connecting rod A¹² and therefore the upward motion produced by the projection of the cam A² in the cam end of the lever A³ is transmitted to the lever A⁶. A⁷ is a pointed pin fixed to the lever A⁶. The point of this pin rests on the top of the spindle of the valve A. The motion produced by the projection of the cam A² is therefore ultimately transmitted to the valve A which opens when its spindle is pressed down by the pin A⁷, and closes by the pressure of the spring A⁸ when the cam end of the lever A³ has been passed by the projection of the cam A². The fulcrum end of the lever A⁶ is hinged to the top of a standard A⁹ fixed on a projection of a clamp A¹⁰ which is fitted on the neck of the valve cap A¹¹. This clamp A¹⁰ can be turned in any direction so as to bring the link end of the lever A⁶ just above the link end of the lever A³, so that these two ends can be suitably connected by a connecting rod as shown.

One means of operating the valve A is as explained above, but in general the ways and means of transmitting motion from the cam shaft to the valve A, depend upon the particular type of the engine and must be left to the judgment of the designer.

As regards the means of operating the valve B we make no alteration in the original design of the makers of the engine. The contour of the cam however requires some alteration which has been already explained in the specification.

For the sake of convenience, we explain below by means of Figs. 4 and 5, how the valve B is operated.

The cam B² is fitted on the cam shaft A¹. A hardened steel roller is fitted in the jaw at one end of the lever B³ and this roller rests on the cam B². The lever B³ also swings on the fulcrum shaft A⁴, B⁴. The valve end of the lever B³ is provided with a cross pin. A screwed set bolt B⁷ is passed through this cross pin. The lower point of this set bolt presses against the spindle of the valve when the cam end of the lever B³ is lifted up by the projection of the cam B². Thus the valve B opens. The spring B⁸ closes the valve B as soon as the cam end of the lever B³ is passed by the projection of the cam.

The contours of both the cams and their position on the cam shaft in relation to the particular position of the piston are already explained in the specification. Adjustment and settings of the cams and valves have to be left to the judgment of the operator.

What we claim as our invention and desire to secure by Letters Patent is:—

1. In an internal combustion engine, a cylinder, a piston therein, a fuel inlet valve and an exhaust valve and a main air inlet valve in the cylinder, an automatic non-return valve adjacent the main air inlet valve and in series therewith, an auxiliary air inlet valve also in series with the main air inlet valve, a source of compressed air connected to the cylinder through the last mentioned two valves in series, and means for opening the main and auxiliary air valves and for closing said valves together at a desired instant after the non-return valve has closed itself.

2. In an internal combustion engine, a cylinder, a piston therein, a fuel inlet valve and an exhaust valve and a main air inlet valve in the cylinder, an automatic non-return valve adjacent the main air inlet valve and in series therewith, an auxiliary air inlet valve also in series with the main air inlet valve, a source of compressed air connected to the cylinder through the last mentioned two valves in series, and means for opening the main and auxiliary air valves and for closing said valves together, during the compression stroke, to augment the charge.

3. In an internal combustion engine, a cylinder, a piston therein, a fuel inlet valve and an exhaust valve and a main air inlet valve in the cylinder, an automatic non-return valve adjacent the main air inlet valve and in series therewith, an auxiliary air inlet valve also in series with the main air inlet valve, a source of compressed air connected to the cylinder through the last mentioned two valves in series, means for opening the main and auxiliary air valves and for closing said valves together during the compression stroke, to augment the charge, and means for opening and closing the auxiliary air inlet and main inlet air valves together near the end of the exhaust stroke to effect scavenging.

4. In an internal combustion engine, a cylinder, a piston therein, a cylinder cover, a fuel inlet valve and an exhaust valve mounted in the cylinder cover, a main air inlet valve arranged in a casing in the cylinder cover, a non-return valve in series with the main air inlet valve and arranged in the cylinder cover, an auxiliary air inlet valve also in series with the main air inlet valve, a casing for the auxiliary air inlet valve said casing being secured to a part of the main air inlet valve casing, and means for opening and closing the main and auxiliary air inlet valves together at desired instants.

In testimony whereof we have signed our names to this specification in the presence of two subscribing witnesses.

TRICAMDAS KALIANJEE.
ANANT BABURAO PARANJAPE.

Witnesses:
 INAND. C. DAMEN,
 JEHANGIR. M. RUTNAGUR.